United States Patent
Ross et al.

(10) Patent No.: US 11,305,758 B2
(45) Date of Patent: Apr. 19, 2022

(54) METHOD AND DEVICE FOR DETERMINING A MAXIMUM SPEED FOR A VEHICLE AND AUTOMATIC DRIVE SYSTEM

(71) Applicant: Robert Bosch GmbH, Stuttgart (DE)

(72) Inventors: Hans-Leo Ross, Lorsch (DE); Thomas Friedrich, Ingersheim (DE)

(73) Assignee: Robert Bosch GmbH, Stuttgart (DE)

( * ) Notice: Subject to any disclaimer, the term of this patent is extended or adjusted under 35 U.S.C. 154(b) by 196 days.

(21) Appl. No.: 16/485,694

(22) PCT Filed: Dec. 13, 2017

(86) PCT No.: PCT/EP2017/082618
§ 371 (c)(1),
(2) Date: Aug. 13, 2019

(87) PCT Pub. No.: WO2018/149536
PCT Pub. Date: Aug. 23, 2018

(65) Prior Publication Data
US 2020/0001866 A1  Jan. 2, 2020

(30) Foreign Application Priority Data
Feb. 15, 2017 (DE) .......................... 102017202363.5

(51) Int. Cl.
*B60W 30/09* (2012.01)
*B62D 15/02* (2006.01)

(52) U.S. Cl.
CPC ......... *B60W 30/09* (2013.01); *B62D 15/0285* (2013.01); *B60W 2520/04* (2013.01);
(Continued)

(58) Field of Classification Search
CPC ............ B60W 30/09; B60W 2554/00; B60W 2520/04; B60W 2520/10; B62D 15/0285; B60Y 2302/05
See application file for complete search history.

(56) References Cited

U.S. PATENT DOCUMENTS 4,632,543 A * 12/1986 Endo ..................... G01S 17/931
356/5.08
6,604,592 B2   8/2003 Pietsch et al.
(Continued)

FOREIGN PATENT DOCUMENTS

DE   102013213169 A1   1/2015
DE   102014010085 A1   1/2015
(Continued)

OTHER PUBLICATIONS

International Search Report for PCT/EP2017/082618, dated Mar. 22, 2018.

*Primary Examiner* — Jelani A Smith
*Assistant Examiner* — Toya Pettiegrew
(74) *Attorney, Agent, or Firm* — Norton Rose Fulbright US LLP; Gerard Messina

(57) ABSTRACT

A method for determining a maximum speed for a vehicle, including: receiving items of state information concerning a state of at least one vehicle component of the vehicle; and determining a maximum speed of the vehicle on the basis of the state information, such that a stopping path of the vehicle from a recognition of a dangerous state until the vehicle is at a standstill is less than or equal to a specified value.

9 Claims, 3 Drawing Sheets

(52) U.S. Cl.
CPC ..... *B60W 2520/10* (2013.01); *B60W 2554/00* (2020.02); *B60Y 2302/05* (2013.01)

(56) References Cited

U.S. PATENT DOCUMENTS

| | | |
|---|---|---|
| 2006/0100783 A1 | 5/2006 | Haberer et al. |
| 2009/0069147 A1* | 3/2009 | Tabata .................. B60K 6/445 477/3 |
| 2011/0118900 A1* | 5/2011 | Uchida ................ G05D 1/0297 701/2 |
| 2014/0097667 A1* | 4/2014 | Backes, III .......... B60T 17/228 303/20 |
| 2015/0210255 A1* | 7/2015 | Fletcher .................. B60T 8/17 701/70 |
| 2018/0148053 A1* | 5/2018 | Lee ........................ G06K 9/209 |
| 2018/0339683 A1* | 11/2018 | Ninoyu .................. B60T 7/042 |
| 2020/0114753 A1* | 4/2020 | Biderman ............ A61B 5/0002 |

FOREIGN PATENT DOCUMENTS

| | | |
|---|---|---|
| DE | 102015207038 A1 | 10/2016 |
| GB | 2310731 A | 9/1997 |
| JP | 2008514937 A | 5/2008 |
| JP | 2012131312 A | 7/2012 |
| JP | 2013230812 A | 11/2013 |
| JP | 2016016812 A | 2/2016 |
| JP | 2016181072 A | 10/2016 |
| WO | 9109275 A2 | 6/1991 |

\* cited by examiner

METHOD AND DEVICE FOR DETERMINING A MAXIMUM SPEED FOR A VEHICLE AND AUTOMATIC DRIVE SYSTEM

FIELD OF THE INVENTION

The present invention relates to a method for determining a maximum speed for vehicle, to a device for determining a maximum speed for vehicle, and to an automated driving system for a vehicle.

BACKGROUND INFORMATION

The braking power of emergency brake assistance systems for vehicles may be reduced for various reasons. For example, the time required to recognize dangerous situations may become longer due to poor weather conditions. In addition, the communication between the components required for emergency braking may become impaired due to a defect, thus increasing the communication time. Finally, deterioration of hydraulic elements of the brake system is also possible, lengthening the brake path.

From DE 10 2013 213 169 A1, it is believed to be understood, after recognizing a defect in components of a vehicle, to put the vehicle into an emergency operating mode and to bring it to a standstill.

SUMMARY OF THE INVENTION

The present invention provides a method for determining a maximum speed for a vehicle having the features described herein, a device for determining a maximum speed for a vehicle having the features described herein, and an automated driving system for a vehicle.

According to a first aspect, the present invention relates to a method for determining a maximum speed for a vehicle. Here, items of state information about a state of at least one vehicle component of the vehicle are received. A maximum speed of the vehicle is determined or calculated, on the basis of the state information, in such a way that a stopping path of the vehicle from a recognition of a dangerous state until the vehicle is at a standstill is less than or equal to a specified value.

According to another aspect, the present invention relates to a device for determining a maximum speed for a vehicle, having an input interface and a determining device. The input interface is configured to receive state information relating to a state of at least one vehicle component of the vehicle. The determining device is configured to determine the maximum speed of the vehicle on the basis of the state information in such a way that a stopping path of the vehicle from a recognition of a dangerous state until the vehicle is at a standstill is less than or equal to a specified value.

According to another aspect, the present invention relates to an automated driving system for a vehicle, having a device for determining a maximum speed for the vehicle and having at least one vehicle component that is coupled to the device and is configured to transmit state information to the device.

Specific embodiments are the subject matter of the respective further descriptions herein.

Vehicle components of the vehicle may be understood as devices of the vehicle that are required for the braking of the vehicle, for example via an automated emergency braking assistant.

The state information concerning the state of the vehicle components may include items of information about a possible impairment of the vehicle components. The state information can also include items of information about a period of time that the corresponding vehicle component requires for its respective contribution to the braking of the vehicle.

If the state of one or more vehicle components is impaired, then in general the stopping path of the vehicle at a specified vehicle speed will become longer. As a result, in specific cases a safe braking of the vehicle may no longer be guaranteed. According to the present invention, therefore, the maximum speed of the vehicle is determined in such a way that the stopping path does not exceed a specified threshold value. In this way, safe braking, and thus prevention of accidents, are possible at all times.

At the same time, the maximum speed may be chosen to be as high as possible, without the stopping path exceeding the specified value. This makes it possible for the driver, or an automatic driving system, to convey the vehicle to a safe parking position or to a repair shop without presenting an obstacle for other traffic participants.

The state information may include information about a state of at least one vehicle sensor of the vehicle, such that on the basis of the information about the state of the at least one vehicle sensor, a recognition time is calculated that is required for recognizing the dangerous state. The maximum speed is determined taking into account the recognition time. The vehicle sensors can for example include radar sensors, infrared sensors, or vehicle cameras that monitor a surrounding environment of the vehicle and are configured to recognize objects in the surrounding environment of the vehicle. The information about the state can include information about a degree of precision of recognition of the at least one vehicle sensor, ascertained for example on the basis of weather conditions around the vehicle.

According to a development, the items of state information include information about a state of a brake system of the vehicle, a braking time from the beginning of the braking process until the vehicle is at a standstill being calculated on the basis of the information about the state of the brake system, and the maximum speed being determined taking into account the braking time.

The calculation of the braking time can include the calculation of a first braking time from a beginning of the braking process until the full braking power has been reached, and the calculation of a second braking time from the reaching of the full braking power until the vehicle is at a standstill. The brake system can for example include an antilocking system. The brake system can also include a hydraulic system. The first braking time corresponds to the time required to build up the brake pressure of the hydraulic system. The delay of the vehicle during the pressure buildup phase is in general not constant, whereas during the second braking time the deceleration is essentially constant.

According to a development of the method, the state information can include information about a state of the communication system between the brake system and the at least one vehicle sensor. On the basis of the information about the state of the communication system, a communication time for the communication between the brake system and the at least one vehicle sensor is calculated, and the maximum speed is determined taking into account the communication time. The method according to the present invention thus takes into account possible time losses due to a suboptimal communication between the components required for the emergency braking.

According to a further development of the device, the state information includes information about the state of at least one vehicle sensor of the vehicle, the determining device being configured to calculate, on the basis of the information about the state of the at least one vehicle sensor, a recognition time required for the recognition of the dangerous state. The determining device is in addition configured to determine the maximum speed taking into account the recognition time.

According to a development of the device, the state information includes information about a state of a brake system of the vehicle, the determining device being configured to calculate, on the basis of the information about the state of the brake system, a braking time from a beginning of the braking process until the vehicle is at a standstill, and to determine the maximum speed taking into account the braking time.

According to a development of the device, in order to calculate the braking time the determining device is configured to calculate a first braking time from a beginning of the braking process until the full braking power is achieved, and a second braking time from the reaching of the full braking power until the vehicle is at a standstill.

According to a development of the device, the items of state information include information about a state of a communication system between the braking system and the at least one vehicle sensor, the determining device being configured to calculate, on the basis of the information about the state of the communication system, a communication time for the communication between the brake system and the at least one vehicle sensor, and to determine the maximum speed taking into account the communication time.

In all the Figures, identical or functionally identical elements and devices have been provided with the same reference characters. Specific embodiments can be combined with one another in any manner deemed appropriate.

DETAILED DESCRIPTION

Figure 1:
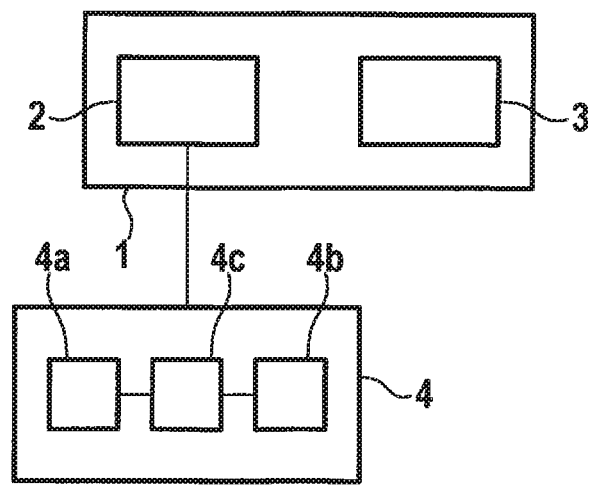
FIG. 1 shows a schematic diagram of a device for determining a maximum speed for a vehicle according to a specific embodiment of the present invention.

FIG. 1 shows a block diagram of a device 1 for determining a maximum speed for a vehicle.

Device 1 includes an input interface 2 that is configured to receive state information concerning a state of vehicle components 4. Input interface 2 can be coupled to the vehicle components 4 for this purpose. In particular, input interface 2 can be capable of being coupled to vehicle components 4 via a bus system of the vehicle.

Device 1 further includes a determining device 3 that is configured to determine, on the basis of the state information, the maximum speed $v_{max}$ of the vehicle in such a way that a stopping path $d_{stopping}$ of the vehicle from a recognition of a dangerous state until the vehicle is at a standstill is less than or equal to a specified value.

Vehicle components 4 include at least one vehicle sensor 4a that can include radar sensors, infrared sensors, or vehicle cameras. Vehicle sensor 4a is configured to provide sensor data or environmental data relating to a surrounding environment of the vehicle. Vehicle sensor 4a may include a recognition device that is configured to recognize a dangerous situation on the basis of the sensor data.

Vehicle components 4 further include a brake system 4b that is configured to brake the vehicle. Brake system 4b may include a hydraulic brake system, for example a plunger-based brake system or a piston brake system. The brake system can in addition include an anti-locking system. The brake system can include an automatic brake system that automatically brakes the vehicle to a standstill when a dangerous state has been recognized by the at least one vehicle sensor 4a.

Vehicle components 4 further include a communication system 4c that is coupled to brake system 4b and to the at least one vehicle sensor 4a and that is configured to transmit information from the at least one vehicle sensor 4a, possibly via at least one control device, to brake system 4b. Communication system 4c can include a bus system of the vehicle.***

Vehicle components 4a, 4b, 4c can each provide corresponding information about the state of the respective vehicle component 4a, 4b, 4c, and transmit it to input interface 2.

This state information can include for example information about a state of the at least one vehicle sensor 4a. This can include for example a recognition time TD ("time to detect") that the at least one vehicle sensor 4a requires in order to acquire an object, such as a pedestrian, to classify it, and to recognize a dangerous state. Recognition time TD thus corresponds to the time required for vehicle sensor 4a to recognize the dangerous state. If at least one of the vehicle sensors 4a fails due to a defect or has a lower precision of recognition due to changed environmental conditions, such as poor weather conditions, then recognition time TD is reduced correspondingly. The information about the state of the at least one vehicle sensor 4a can include the recognition time TD reduced in this way. The information about the state of the at least one vehicle sensor 4a can however also include information relating to a defect or to the operating states of vehicle sensor 4a, determining device 3 being configured to calculate recognition time TD on the basis of this information.

The state information can in addition include information about a state of brake system 4b, for example information as to whether brake system 4b is in a normal state or in an impaired state. Determining device 3 is configured to calculate, based on the information about the state of brake system 4b, a brake time TB ("time to brake") from a beginning of the braking process until the vehicle is at a standstill. Determining device 3 here calculates a first brake time TTL ("time to lock") from a beginning of the braking process until the full braking power is achieved. In a hydraulic brake system, this corresponds to the time required to build up the complete brake pressure. In addition, determining device 3 calculates a second brake time $T_{stop}$ from the reaching of the full brake power until the vehicle is at a standstill. This corresponds to the time required by the brake system to brake the vehicle at full brake pressure.

Braking time TB corresponds to the sum of first braking time TTL and second braking time $T_{stop}$.

In addition, the items of state information include information about a state of communication system $4c$, determining device 3 being configured to calculate, on the basis of the information about the state of the communication system $4c$, a communication time TT ("time to travel") for the communication between brake system $4b$ and the at least one vehicle sensor $4a$.

The respective items of state information can be ascertained by the respective vehicle components 4 themselves, using recognition algorithms. However, the items of state information can also be ascertained by a sensor device of device 1.

According to further specific embodiments, the items of state information can already include recognition time TD, brake time TB, and/or communication time TT.

Determining device 3 is configured to calculate a maximum stopping path $d_{stopping}$ of the vehicle, which is initially moving at a maximum speed $v_{max}$, on the basis of the following equation:

$$d_{stopping} = d1 + d2 + d3 + d4,$$

where $d1 = TD \cdot v_{max}$, $d2 = TT \cdot v_{max}$, $d3 = TTL \cdot v_{max} - \frac{1}{6} \cdot k \cdot TTL^3$, and $d4 = v_{rest}^2 / (2 \cdot a_{max})$.

The first stopping path segment d1 corresponds to the path traveled during recognition time TD, the second stopping path segment d2 corresponds to the path traveled during communication time TT, the third stopping path segment d3 corresponds to the path traveled during the first braking time TTL, and the fourth stopping path segment d4 corresponds to the path traveled during the second braking time $T_{stop}$.

The variable $a_{TTL} = k \cdot TTL$ is the delay during the pressure buildup phase, where $k = a_{max}/TTL$ is the linear increase. Here, $a_{max}$ is the maximum deceleration that brake system $4b$ exerts on the vehicle during second braking time $T_{stop}$. The first integral of $a_{TTL}$ is $v_{TTL} = \frac{1}{2} \cdot k \cdot TTL^2$ and the second integral is $d_{TTL} = \frac{1}{6} \cdot k \cdot TTL^3$, which is the second term of third stopping path segment d3.

While, here, a linear curve is assumed for the deceleration, determining device 3 can also take into account, as a function of the characteristic of brake system $4b$, a non-linear functional dependence of the deceleration on the first braking time TTL; in this case the respective shapes would be correspondingly modified.

In addition, $v_{rest} = v_{max} - \frac{1}{2} \cdot k \cdot TTL^2$ is the residual speed after the complete buildup of brake pressure, i.e. after first braking time TTL. Substituting this relation into the equation for the stopping path $d_{stopping}$ yields the following equation:

$$d_{stopping} = TD \cdot v_{max} + TT \cdot v_{max} - TTL \cdot v_{max} - \frac{1}{6} \cdot k \cdot TTL^3 + (v_{max} - \frac{1}{2} \cdot k \cdot TTL^2)^2 / (2 \cdot a_{max})$$

In an errored or degraded state, first braking time TTL, second braking time $T_{stop}$, recognition time TD and communication time TT, as well as the maximum deceleration $a_{max}$, can deviate from the corresponding values in the normal state. In the degraded state, determining device 3 calculates stopping path $d_{stopping}$ according to the following equation, in which the maximum speed $v_{max,degr}$ is a free parameter:

$$d_{stopping\ degr,degr} = TD_{degr} \cdot v_{max,degr} + TT_{degr} \cdot v_{max,degr} TTL_{degr} \cdot v_{max,degr} - \frac{1}{6} \cdot k \cdot TTL_{degr}^3 + (v_{max,degr} - \frac{1}{2} \cdot k \cdot TTL_{degr}^2)^2 / (2 \cdot a_{max,degr}).$$

Here, the index "degr" stands for the value of the respective variable in the degraded state.

Figure 2:
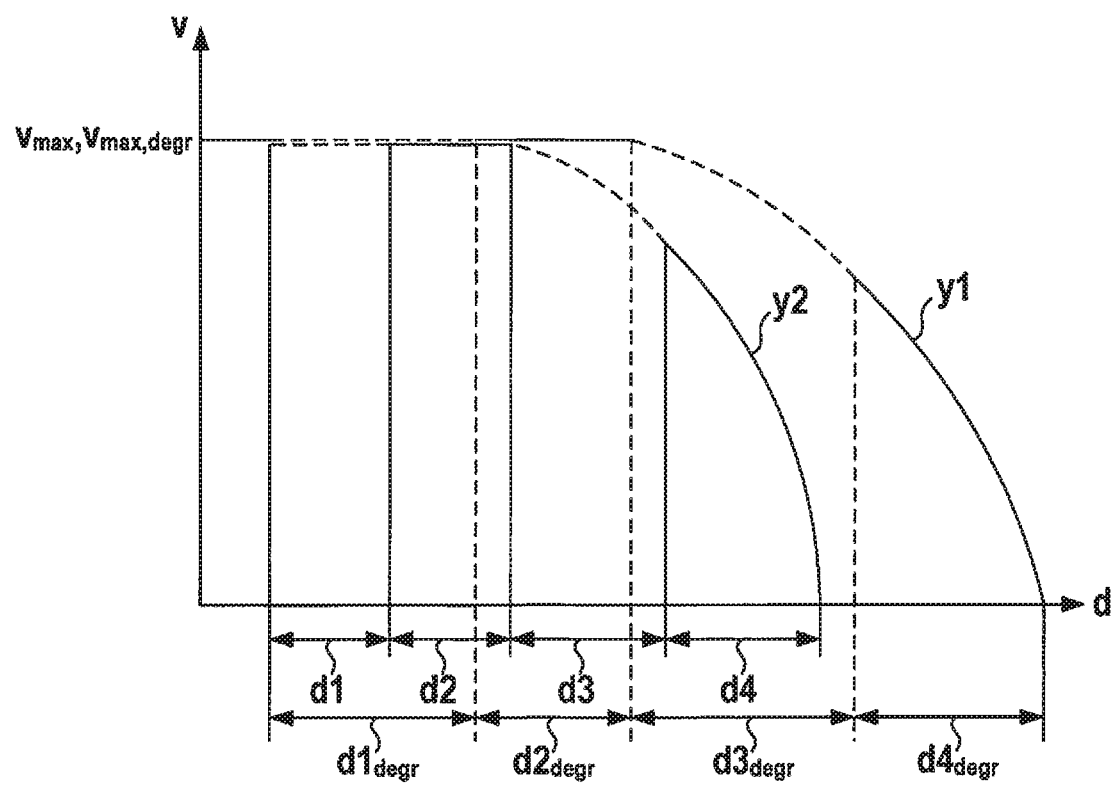
FIG. 2 shows an illustration of a stopping path of a vehicle under normal conditions and under impaired conditions, with the same initial speed in each case.

If the maximum speed $v_{max}$ of the vehicle is not changed, i.e. if $v_{max} = v_{max,degr}$, then the scenario shown in FIG. 2 results. In the normal state, the course of speed v shown in curve y1 results as a function of the traveled distance d. Due to the stopping path segments, prolonged in the degraded state, $d1_{degr}$, $d2_{degr}$, $d3_{degr}$, $d4_{degr}$, the overall stopping path becomes longer, as can be seen in the course of speed v shown in curve y2.

Figure 3:
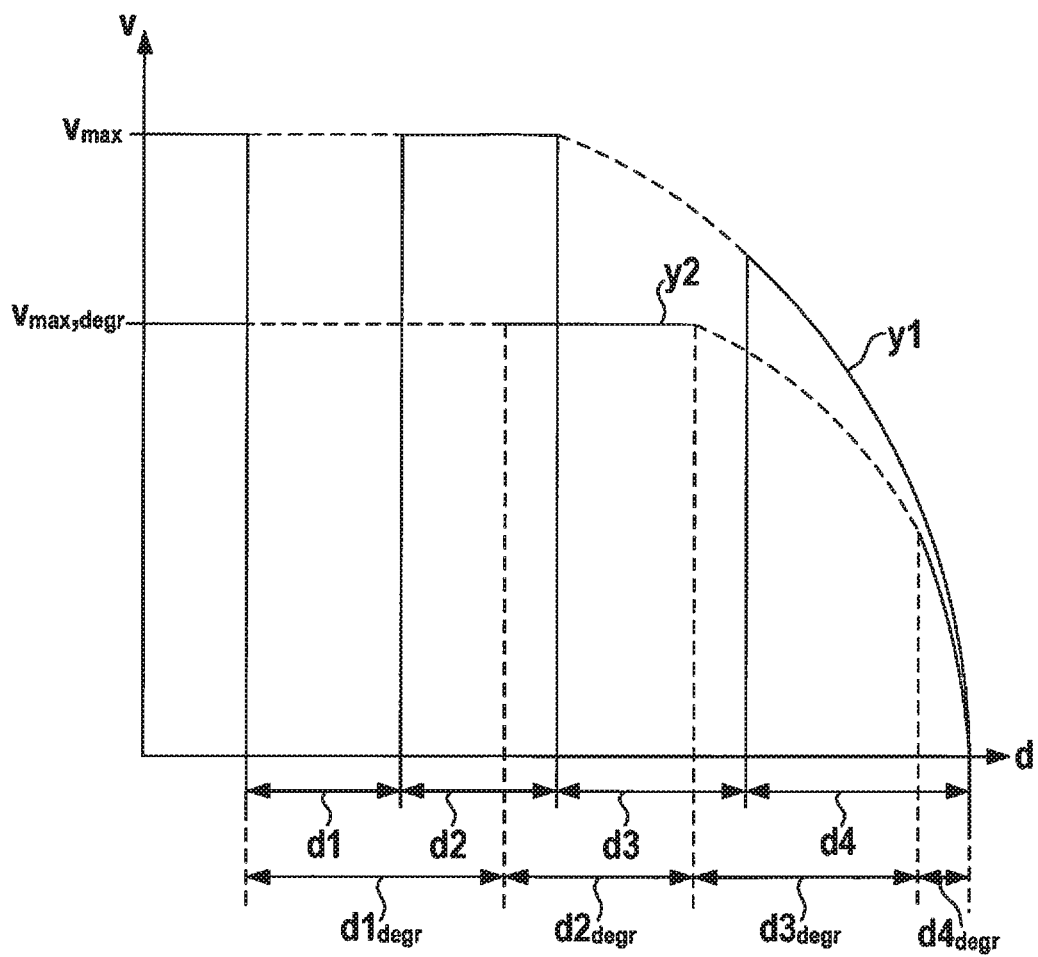
FIG. 3 shows an illustration of the stopping path under normal conditions and under impaired conditions and with reduced initial speed.

Determining device 3 is configured to calculate the maximum speed $v_{max}$ in such a way that the stopping path $d_{stopping,degr}$ in the degraded state, starting from the maximum speed $v_{max,degr}$ in the degraded state, is the same size as the stopping path $d_{stopping}$ in the normal state, starting from the maximum speed $v_{max}$ in the normal state. This corresponds to the scenario illustrated in FIG. 3.

Thus, determining device 3 calculates the maximum speed $v_{max}$ under the condition $d_{stopping} = d_{stopping,degr}$. Substitution and rewriting first yields the following equation:

$$d_{stopping} + \frac{1}{6} \cdot k \cdot TTL_{degr}^3 = TD_{degr} \cdot v_{max,degr} + TT_{degr} \cdot b_{max,degr} + TTL_{degr} \cdot v_{max,degr} + v_{max,degr}^2/(2 \cdot a_{max,degr}) - v_{max,degr} \cdot k \cdot TTL_{degr}^2/2 \cdot a_{max,degr} + \frac{1}{4} \cdot k^2 \cdot TTL_{degr}^4/(2 \cdot a_{max,degr})$$

and, finally, the following equation:

$$d_{stopping} + \frac{1}{6} \cdot k \cdot TTL_{degr}^3 - \frac{1}{4} \cdot k^2 \cdot TTL_{degr}^4/(2 \cdot a_{max,degr}) = v_{max,degr} \cdot (TD_{degr} + TT_{degr} + TTL_{degr} - k \cdot TTL_{degr}^2/(2 \cdot a_{max,degr})) + v_{max,degr}^2/(2 \cdot a_{max,degr}).$$

The latter expression is a second-order equation for $v_{max,degr}$ that is correspondingly solved by determining device 3 according to $v_{max,degr}$. The value obtained by solving this equation is the maximum speed calculated by determining device 3.

According to a development, device 1 can be configured to control brake system $4b$ in such a way that the first brake time TTL is reduced when determining device 3 recognizes, on the basis of the state information, the impairment of at least one vehicle component 4. Thus, device 1 can control brake system $4b$ using a control signal in such a way that a hydraulic brake apparatus of brake system $4b$ is pre-filled with a pressure at a specified level, for example 5 bar. In this way, the time required to reach full braking power is reduced.

Device 1 can in addition be configured to output a control signal in order to control the vehicle in such a way that a maximum achievable speed of the vehicle is limited by the determined maximum speed $v_{max}$.

In addition, device 1 can include a display device that displays the determined maximum speed to the driver of the vehicle.

Device 1 can be an element of a driver assistance system for a vehicle that is configured to control the vehicle in such a way that the absolute speed of the vehicle is always less than the maximum speed $v_{max}$.

Figure 4:
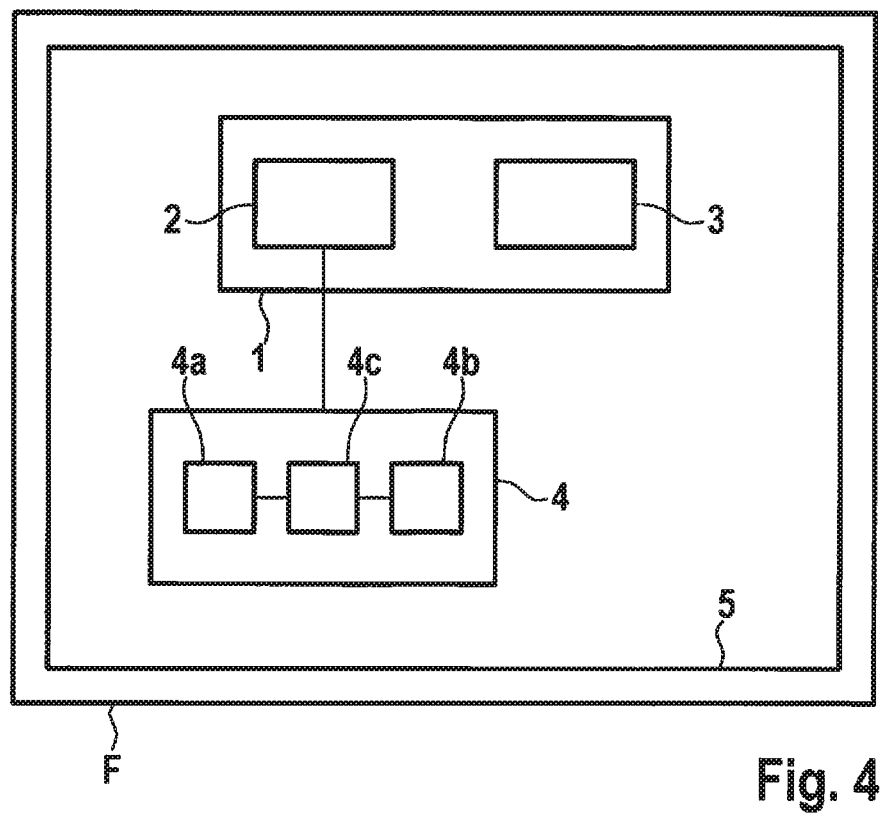
FIG. 4 shows a schematic diagram of an automated driving system for a vehicle according to a specific embodiment of the present invention.

FIG. 4 shows an automated driving system 5 for a vehicle F according to a specific embodiment of the present invention. Automated driving system 5 includes a device 1 for determining a maximum speed $v_{max}$ for vehicle F according to one of the above-described specific embodiments. Automatic driving system 5 also has at least one vehicle component 4 that is coupled to device 1 and is configured to transmit state information to device 1. Vehicle component 4 may include, as described above, at least one vehicle sensor $4a$, a brake system $4b$, and a communication system $4c$ between brake system $4b$ and the at least one vehicle sensor $4a$.

Device 1 further includes a determining device 3 that, as described above, is configured to determine the maximum speed $v_{max}$ of the vehicle.

Automated driving system 5 may have a control device that is configured to autonomously control vehicle F, a driving speed of vehicle F always being less than the defined maximum speed $v_{max}$.

Figure 5:
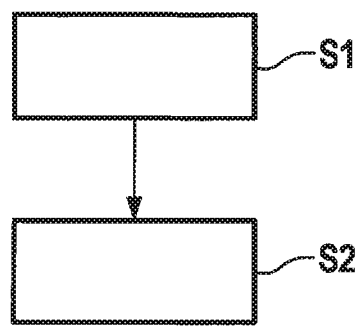
FIG. 5 shows a flow diagram explaining a method for determining a maximum speed for a vehicle according to a specific embodiment of the present invention.

FIG. 5 shows a flow diagram explaining a method for determining a maximum speed for a vehicle F.

In a first method step S1, state information is received concerning a state of at least one vehicle component 4 of vehicle F.

In a further method step S2, a maximum speed $v_{max}$ of vehicle F is determined on the basis of the state information, a stopping path of vehicle F from a recognition of a dangerous state until vehicle F is at a standstill always being less than or equal to a specified value. The calculation of the maximum speed $v_{max}$ can be carried out according to one of the specific embodiments described above.

The invention claimed is:

1. A method of a vehicle, the method comprising:
    the vehicle monitoring a state of a braking system of the vehicle;
    a processor of the vehicle determining, as a first time period and based on the monitored state of the braking system, an amount of time required for building up a maximum braking potential in the braking system;
    the processor determining, as a second time period, an amount of time required to bring the vehicle to a standstill after the maximum braking potential is built up in the braking system;
    the processor determining a maximum speed of the vehicle based on the first and second time periods, such that a stopping path of the vehicle from a recognition of a dangerous state until the vehicle is at a standstill is less than or equal to a specified value; and
    the processor outputting an indication of the determined maximum speed to a user interface or performing an automatic control of the vehicle speed based on the determined maximum speed.

2. The method of claim 1, further comprising the vehicle monitoring a state of at least one vehicle sensor of the vehicle and, based on the state of the at least one vehicle sensor, a recognition time required for the recognition of the dangerous state, wherein the maximum speed is determined additionally based on the recognition time.

3. The method of claim 2, further comprising the vehicle monitoring a state of a communication system between the brake system and the at least one vehicle sensor and the processor determining a communication time for a communication between the brake system and the at least one vehicle sensor, wherein the maximum speed is determined additionally based on the communication time.

4. A device of a vehicle, the device comprising:
    a processor; and
    an input interface;
    wherein the processor is configured to:
        receive state information about, and obtained by the vehicle monitoring, a state of a braking system of the vehicle;
        determine, as a first time period and based on the monitored state of the braking system, an amount of time required for building up a maximum braking potential in the braking system;
        determine, as a second time period, an amount of time required to bring the vehicle to a standstill after the maximum braking potential is built up in the braking system;
        determine the maximum speed of the vehicle based on the first and second time periods so that a stopping path of the vehicle from a recognition of a dangerous state until the vehicle is at a standstill is less than or equal to a specified value; and
        output an indication of the determined maximum speed to a user interface of the device or perform an automatic control of the vehicle speed based on the determined maximum speed.

5. The device of claim 4, wherein the processor is configured to receive state information about, and obtained by the vehicle monitoring, a state of at least one vehicle sensor of the vehicle and calculate, based on the state of the at least one vehicle sensor, a recognition time that is required to recognize the dangerous state, and wherein the maximum speed is determined additionally based on the recognition time.

6. The device of claim 5, wherein the processor is configured to receive state information about, and obtained by the vehicle monitoring, a state of a communication system between the brake system and the at least one vehicle sensor and calculate, based on the state of the communication system, a communication time for a communication between the brake system and the at least one vehicle sensor, and wherein the maximum speed is determined additionally based on the communication time.

7. An automated driving system for a vehicle, the automated driving system comprising:
    a device including a processor and an input interface, wherein the processor is configured to:
        receive state information about, and obtained by the vehicle monitoring, a state of a braking system of the vehicle;
        determine, as a first time period and based on the monitored state of the braking system, an amount of time required for building up a maximum braking potential in the braking system;
        determine, as a second time period, an amount of time required to bring the vehicle to a standstill after the maximum braking potential is built up in the braking system;
        determine the maximum speed of the vehicle based on the first and second time periods so that a stopping path of the vehicle from a recognition of a dangerous state until the vehicle is at a standstill is less than or equal to a specified value;
        perform an automatic control of the vehicle speed based on the determined maximum speed.

8. The method of claim 1, wherein the first time period is an amount of time required for a maximal brake pressure build up in hydraulics of the braking system.

9. The method of claim 1, wherein the method comprises the processor performing the automatic control of the vehicle speed based on the determined maximum speed.

* * * * *